Patented Jan. 26, 1937

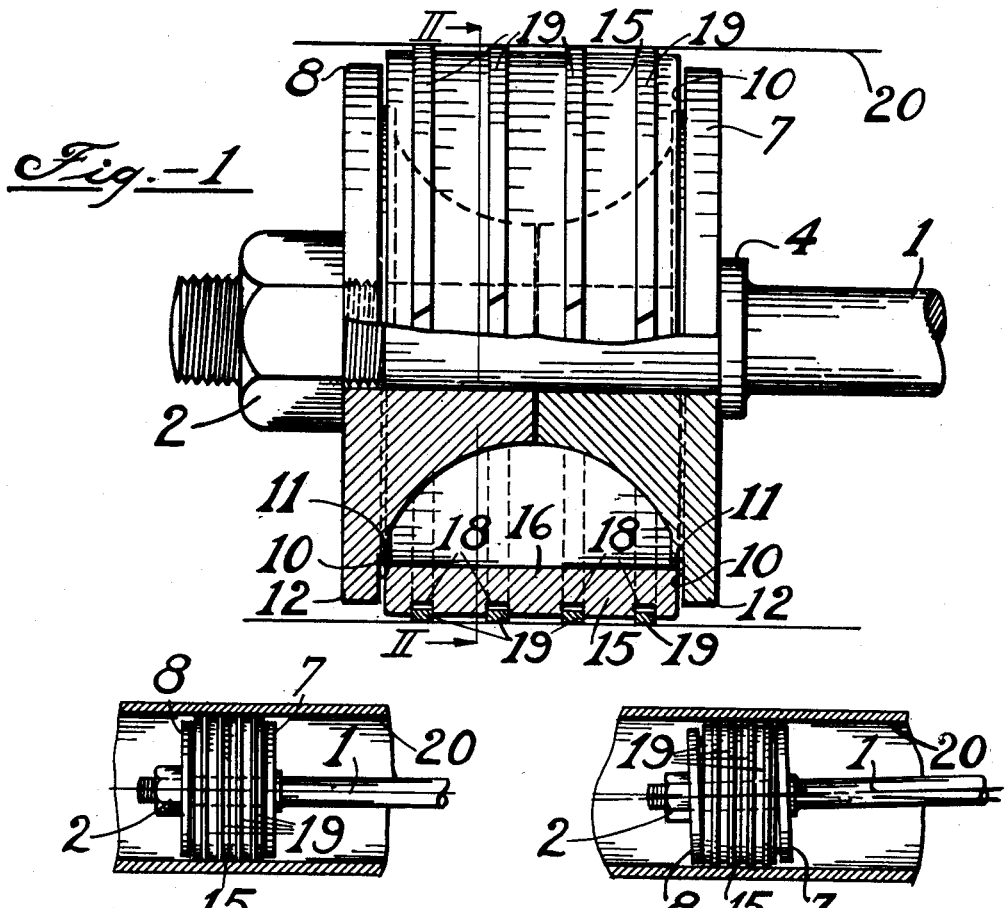

2,068,859

UNITED STATES PATENT OFFICE 2,068,859

FLOATING PUMP PLUNGER

William Jones, Linden, James Sharp, Elizabeth, and William H. Boehm, Roselle Park, N. J., assignors to Standard Oil Development Company, a corporation of Delaware Application April 5, 1935, Serial No. 14,770

3 Claims. (Cl. 309—4)

This invention relates to improvements in a floating plunger for a reciprocating pump.

The inside walls of pump barrels as previously constructed have been scored by the tubular plunger due to misalignment of the piston rod and pump barrel due to wearing of the moving parts and tipping or canting of the plunger to an angular position. It is an object of this invention to eliminate scoring of the inside of pump barrels caused by tipping or canting of the pump rod.

The invention will be fully understood from the following description taken in connection with the accompanying drawing in which latter:

Fig. 1 is a side elevational view partly in longitudinal section of the self-centering plunger applied to the piston rod of a conventional pressure pump, the rod being shown fragmentarily in an elevation. Fig. 2 is a transverse sectional view taken along the line II—II of Fig. 1. Fig. 3 is a side elevational view of the piston with the piston rod in its proper aligned position, and Fig. 4 is a side elevational view showing the relative position of the self-centering plunger with respect to the head of the piston when the piston rod is at an angular position.

Referring particularly to the drawing reference numeral 1 designates a conventional pump piston rod which is threaded at one end to receive a lock nut 2. An angular flange or collar 4 is formed on the piston rod 1 inwardly from the threaded end of the rod.

A follower head is held rigidly against the collar 4 by the locked nut 2. The follower head comprises two follower sections 7 and 8. The adjoining walls of the follower sections 7 and 8 are grooved to form an annular recess 10. Each follower section 7 and 8 is provided with an annular shoulder portion 11 which projects into the annular recess 10 and an annular flange 12 protrudes radially outwardly from the shouldered portion 11 of each follower section 7 and 8.

A tubular plunger 15 loosely fits within the recess 10. The tubular plunger 15 is of greater external diameter than the follower sections 7 and 8 and the inner wall 16 of the tubular plunger is of greater diameter than the diameter of the shoulders 11 of the follower sections 7 and 8. The tubular plunger 15 is shorter in length than the space between the annular flanges 12 of the follower sections 7 and 8. As a result of this construction sufficient clearance is provided between the annular plunger 15 and the adjoining portions of the follower head to allow for a moving fit. Free movement of the tubular plunger 15 with respect to the follower head is permitted. The free tubular plunger 15 remains centered within the pump barrel 20 at all points of the stroke of the piston even though the piston becomes tipped or canted at an angular position. Scoring of the inside of the pump barrel 20 is practically eliminated since the tubular plunger remains centered in the pump barrel 20 even though the piston rod becomes misaligned with the cylinder due to wearing. The tubular plunger 15 acts as a cradle for the follower sections 7 and 8 to rest upon at the shoulders 11 upon misalignment of the piston rod 1 with respect to the cylinder 20. The tubular plunger 15 is thicker than the distance which the annular flange 12 extends beyond the shouldered portions 11 so that the annular flanges 12 do not wear against the walls of the cylinder 20 when the pump rod 1 is tipped or canted to an angular position.

By the construction described the free tubular plunger 15 remains centered within the pump barrel 20 at all points of the stroke. The tubular plunger 15 does not form an integral mass with the follower head. The plunger 15 is self-centering and therefore scoring of the inside of the pump barrel is practically eliminated. The tubular plunger 15 is provided with a series of annular grooves 18 on its outside surface which act as liquid seals for low pressure pumps. The tubular plunger 15 with the grooves 18 only is adaptable for pumps operating at pressures to a maximum of approximately 125 pounds per square inch. For higher pressures and for high gravity liquids snap rings 19 are inserted into the grooves 18 to insure tightness. This design of follower head eliminates the use of rubber and duck packing which is worn down by friction necessitating frequent renewals as occurs particularly when the pump is in sour oil service. The plunger operates on a liquid sealing thereby preventing wear of the parts. Replacement of the parts of the device merely requires removal of the nut 2 and the follower section 8.

Various changes in alternative arrangements may be made within the scope of the appended claims in which it is our intention to claim all novelty inherent in the invention as broadly as the prior art permits.

We claim:

1. A pump plunger including a follower head, an annular recess in the side of the head, annular shoulders formed in the recess, adjacent the edges of the side walls thereof, adapted to freely engage the inner edges of a rigid tubular plunger member of lesser length than the recess and loosely disposed therein, said plunger member having a diameter substantially greater than that of the follower head and a thickness greater than the depth of the recess at the shoulders.

2. A pump plunger according to claim 1 in which the plunger member is provided with a plurality of spaced annular grooves in its side walls adapted to receive snap fit rings.

3. In a pump cylinder, a plunger comprising a follower head mounted on a pump rod, annular flanges at each end of the head, annular shoulders disposed inwardly of said flanges and adjacent their outer edges, and a rigid tubular plunger member, loosely disposed between the flanges in variable engagement with said annular shoulders, having a diameter greater than said flanges and a thickness greater than the width of the flanges at the shoulders, whereby contact between the head and the cylinder walls is prevented during angular movement of the head with relation thereto.

WILLIAM JONES.
JAMES SHARP.
WILLIAM H. BOEHM.